US006895574B2

(12) United States Patent
Walster

(10) Patent No.: US 6,895,574 B2
(45) Date of Patent: May 17, 2005

(54) METHOD AND APPARATUS FOR AUTOMATICALLY PRODUCING EFFICIENT CODE FOR COMPUTING DERIVATIVES

(75) Inventor: G. William Walster, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 735 days.

(21) Appl. No.: 09/895,902

(22) Filed: Jun. 28, 2001

(65) Prior Publication Data

US 2003/0023645 A1 Jan. 30, 2003

(51) Int. Cl.$^7$ ............................................. G06F 9/45
(52) U.S. Cl. ........................................................ 717/106
(58) Field of Search ........................... 717/106; 708/433, 708/6; 703/6

(56) References Cited

U.S. PATENT DOCUMENTS

| | | | | | |
|---|---|---|---|---|---|
| 4,817,027 | A | * | 3/1989 | Plum et al. ................. | 708/443 |
| 5,189,633 | A | * | 2/1993 | Bonadio .................... | 708/142 |
| 5,731,820 | A | * | 3/1998 | Broekhuijsen .............. | 345/442 |
| 6,397,380 | B1 | * | 5/2002 | Bittner et al. ............... | 717/151 |
| 6,442,512 | B1 | * | 8/2002 | Sengupta et al. ............ | 703/6 |
| 6,633,837 | B1 | * | 10/2003 | Dye et al. .................... | 703/9 |
| 6,772,136 | B2 | * | 8/2004 | Kant et al. ................... | 706/50 |

OTHER PUBLICATIONS

Neidinger, R. An Efficient Method for the Numerical Evaluation of Partial Derivatives . . . , 1992, ACM, p. 159–173.*
Wengert, R. A Simple Automatic Derivative Evaluation Program.*

* cited by examiner

Primary Examiner—John Chavis
(74) Attorney, Agent, or Firm—Park, Vaughan & Fleming LLP

(57) ABSTRACT

One embodiment of the present invention provides a system that automatically computes a derivative of a numerical expression within a digital computer system. The system operates by receiving a representation of the numerical expression, wherein the numerical expression includes one or more independent variables. Next, the system forms an expression tree for the derivative of the numerical expression with respect to an independent variable, wherein the expression tree makes use of temporary variables to form results of sub-expressions for computing the derivative. While forming this expression tree, the system seeks to introduce only temporary variables and associated sub-expressions as necessary to eliminate repeated common sub-expressions, thereby substantially minimizing the number of temporary variables. The system subsequently uses this expression tree to compute the derivative of the numerical expression during a computation.

30 Claims, 4 Drawing Sheets

METHOD AND APPARATUS FOR AUTOMATICALLY PRODUCING EFFICIENT CODE FOR COMPUTING DERIVATIVES

BACKGROUND

1. Field of the Invention

The present invention relates to compilers and numerical computations. More specifically, the present invention relates to a method and an apparatus for automatically producing efficient code for computing derivatives and/or slopes of functions within in a digital computer system.

2. Related Art

Computer systems are routinely used to solve non-linear problems, including, but not limited to: systems of non-linear equations, ordinary and partial differential equations, and global optimization problems. Global optimization problems, for example, occur in applications as diverse as predicting the weather, designing an aircraft engine or optimizing a financial portfolio. In order to solve non-linear problems, expressions for the first, second and even higher order derivatives of functions and constraint equations are typically needed.

These expressions for derivatives can be generated automatically through a technique known as "automatic differentiation" (AD), which symbolically differentiates binary operations within in a code list. For example, the expression, $$f(x) = \frac{x+1}{\sin(x+1)}$$

can be represented in code list form as,

TABLE 1

| T1 = X + 1 |
| T2 = X + 1 |
| T3 = SIN(T2) |
| F = T1/T3 |

The corresponding derivative of this expression is, $$\frac{df(x)}{d(x)} = \frac{\sin(x+1) - (x+1)\cos(x+1)}{\sin^2(x+1)}$$

which can be represented in code list form including derivatives of temporary variables as,

TABLE 2

| T1 = X + 1 | D1 = 1 |
| T2 = SIN(T1) | D2 = COS(T1)*D1 |
| T3 = X + 1 | D3 = 1 |
| T4 = COS(T3) | D4 = SIN(T3)*D3 |
| T5 = X + 1 | D5 = 1 |
| T6 = T5*T4 | D6 = T5*D4 + T4*D5 |
| T7 = T2 − T6 | D7 = D2 − D6 |
| T8 = X + 1 | D8 = 1 |
| T9 = SIN(T8) | D9 = COS(T8)*D8 |
| T10 = T9**2 | D10 = 2*T9*D9 |
| F = T7/T10 | DF = (T10*D7 − T7*D10)/T10**2 |

Note that automatic differentiation creates an unnecessary explosion in the number of temporary variables. This causes a number of negative consequences because (1) unnecessary temporary variables consume memory; (2) computing unnecessary temporary variables needlessly slows execution; and (3) in a interval arithmetic context, unnecessary temporary variables introduce unnecessary dependencies that produce unnecessarily wide interval results.

What is needed is a method and an apparatus for automatically generating code to calculate derivatives of an expression without generating unnecessary temporary variables.

SUMMARY

One embodiment of the present invention provides a system that automatically computes a derivative of a numerical expression within a digital computer system. The system operates by receiving a representation of the numerical expression, wherein the numerical expression includes one or more independent variables. Next, the system forms an expression tree for the derivative of the numerical expression with respect to an independent variable, wherein the expression tree makes use of temporary variables to form results of sub-expressions for computing the derivative. While forming this expression tree, the system seeks to introduce only temporary variables and associated sub-expressions as necessary to eliminate repeated common sub-expressions, thereby substantially minimizing the number of temporary variables. The system subsequently uses this expression tree to compute the derivative of the numerical expression during a computation.

In one embodiment of the present invention, for each temporary variable in the expression tree, the method forms an expression for a partial derivative of the temporary variable with respect to each independent variable.

In one embodiment of the present invention, forming the expression for a given partial derivative involves defining new temporary variables and corresponding sub-expressions and new partial derivatives.

In one embodiment of the present invention, a given sub-expression can include a multinomial that contains more than one binary operation.

In one embodiment of the present invention, the system additionally prunes sub-expressions and associated temporary variables that are not used by the computation. In a variation on this embodiment, pruning sub-expressions involves marking all temporary variables used in evaluating the expression, and then deleting unmarked temporary variables and associated sub-expressions.

In one embodiment of the present invention, the system is part of a compiler, and the representation of the numerical expression is in the form of an Abstract Syntax Tree (AST).

In one embodiment of the present invention, the system is part of a pre-compiler. In this embodiment, the expression tree is in the form of a source code list, and each temporary variable and associated sub-expression in the expression tree is represented by computer code that sets the temporary variable equal to the associated sub-expression.

In one embodiment of the present invention, the system is embodied in computer code within a code library, such as a C++ class library or a FORTRAN module.

In one embodiment of the present invention, the computation involves interval arithmetic, and the independent variables are interval variables.

Table 1 illustrates a code list for an expression in accordance with an embodiment of the present invention.

Table 2 illustrates a code list for a derivative of an expression.

Table 3 illustrates a code list for a derivative of an expression in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
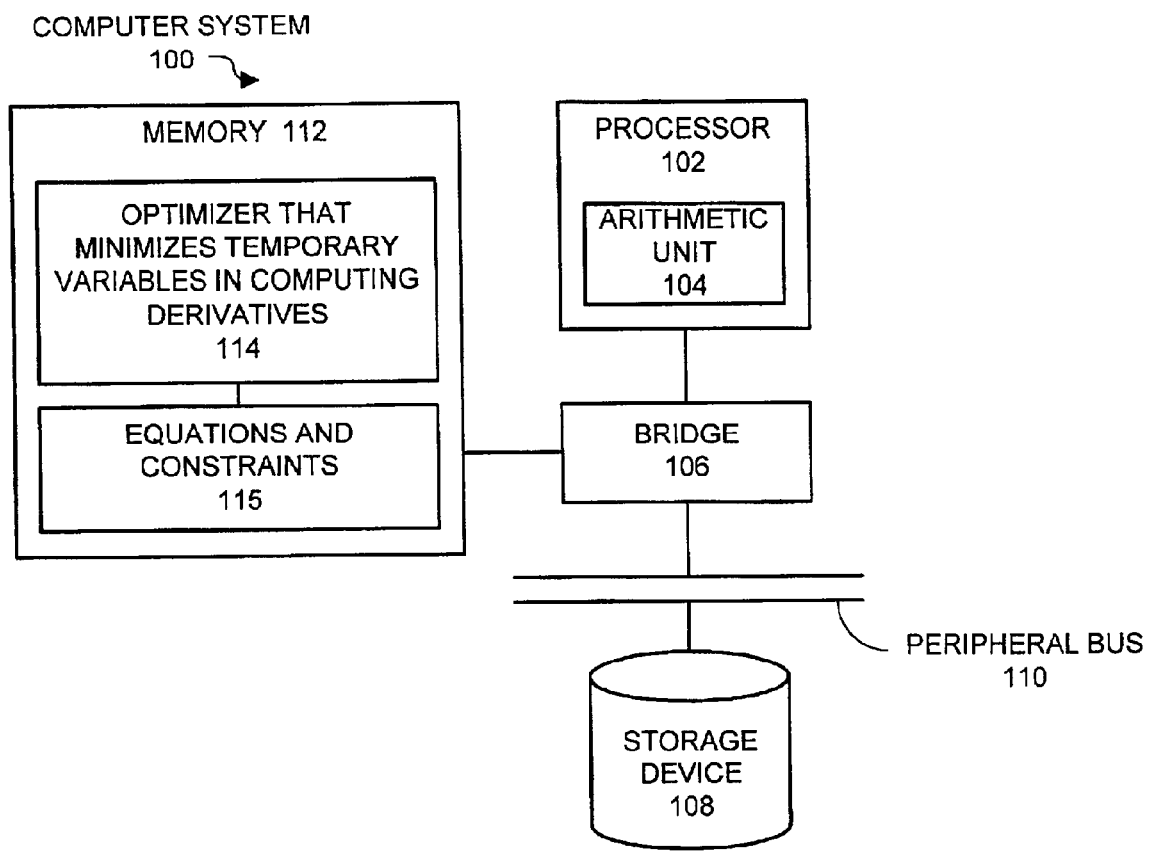
FIG. 1 illustrates a computer system including an optimizer in accordance with an embodiment of the present invention.

FIG. 1 illustrates a computer system 100 including an optimizer 114 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains optimizer 114. Optimizer 114 contains instructions for optimizing a set of equations and constraints 115. Note that during operation optimizer 114 seeks to minimize the number of temporary variables involved in computing derivatives of the equations and constraints. The structure of optimizer 114 is described in more detail below with reference to FIGS. 2–5.

Note that optimizer 114 may also include code for solving general optimization problems involving intervals. Techniques for solving these general optimization problems are described in a book entitled, "Global Optimization Using Interval Analysis," by Eldon Hansen, published by Marcel Dekker, Inc., 1992.

Furthermore, note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Generating Code to Compute a Derivative

Figure 2:
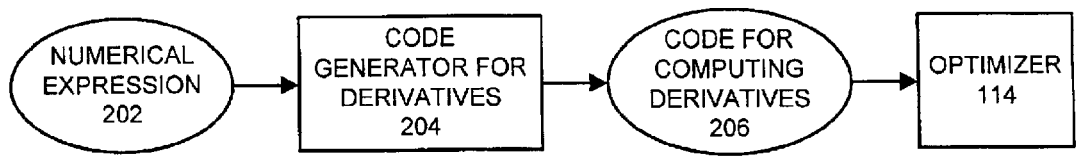
FIG. 2 illustrates how code for computing a derivative is generated in accordance with an embodiment of the present invention.

FIG. 2 illustrates how code is generated for computing a derivative in accordance with an embodiment of the present invention. The system starts with a numerical expression 202, such as $(x+1)/\sin(x+1)$. This numerical expression feeds into a code generator for derivatives 204, which outputs code for computing derivatives 206. Optimizer 114 (from FIG. 1) makes use of this code 206 in calculating first order and/or second order derivatives for the numerical expression.

Pre-Compiler Implementation

Figure 3:
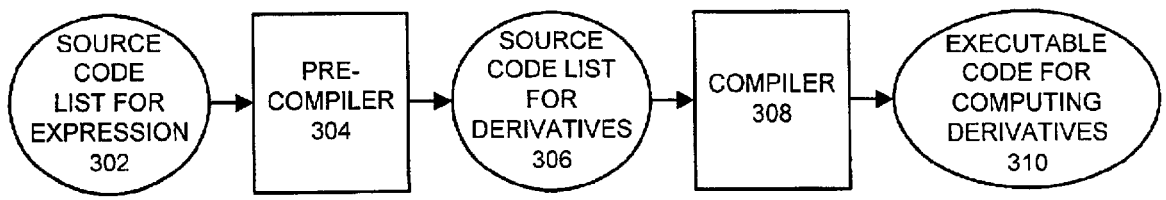
FIG. 3 illustrates how code for computing a derivative is generated within a pre-compiler in accordance with an embodiment of the present invention.

FIG. 3 illustrates how source code to compute a derivative is generated within a pre-compiler in accordance with an embodiment of the present invention. In this embodiment, a source code list for the expression 302 is received by the pre-compiler 304. Source code list 302 is used to generate a source code list for one or more derivatives 306. Source code list for derivatives 306 is then fed through compiler 308, which ultimately produces executable code 310 for computing the derivatives.

This pre-compiler implementation is a preferred implementation in cases where it is not possible to gain access to the internal workings of compiler 308.

Compiler Implementation

Figure 4:
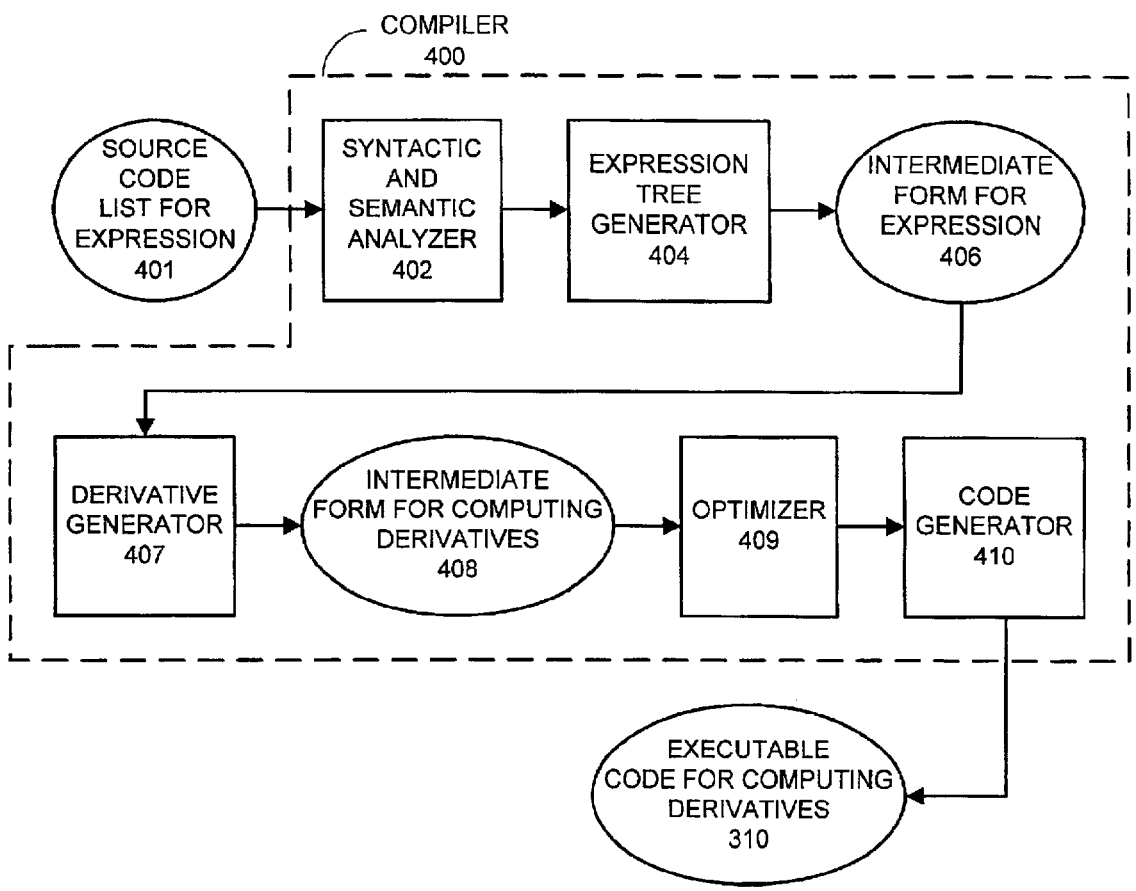
FIG. 4 illustrates how code for computing a derivative is generated within a compiler in accordance with an embodiment of the present invention.

FIG. 4 illustrates how code to compute a derivative is generated within a compiler 400 in accordance with an embodiment of the present invention. Compiler 400 includes a number of components, including syntactic and semantic analyzer 402, expression tree generator 404, derivative generator 407, optimizer 409 and code generator 410.

Compiler 400 receives a source code list 401 for the expression in source code form and passes it through syntactic and semantic analyzer 402 to determine whether or not source code list 401 adheres to the rules of the programming language in which it is written. If not, the system outputs an error message.

Next, source code list 401 passes through expression tree generator 404, which converts source code list 401 into intermediate form 406. This intermediate form 406 includes expression trees for expressions in source code list 401.

Next, intermediate form 406 passes through derivative generator 407, which produces a corresponding intermediate form 408 for computing derivatives of the expression. Note that intermediate form 408 includes expression trees for derivatives of expressions in source code list 401. This process of forming expression trees for derivatives is described in more detail with reference to FIG. 5 below.

Intermediate form 408 for computing derivatives then passes through optimizer 409, which makes performance-improving transformations on the code.

Finally, the output of optimizer 409 passes through code generator 410, which produces executable code 310 for computing derivatives. Executable code 310 can include code that is written in a native instruction set, as well as platform-independent instructions, such as bytecodes defined in the JAVA™ programming language. (Sun, the Sun logo, Sun Microsystems, and Java are trademarks or registered trademarks of Sun Microsystems, Inc. in the United States and other countries.)

Although FIG. 4 illustrates that compiler 400 produces expressions for derivatives by operating on an intermediate form for the expressions, compiler 400 can alternatively produce expressions for the derivatives by operating on source code or a combination of source code and an intermediate form for the expressions.

Process of Generating Code to Compute a Derivative

Figure 5:
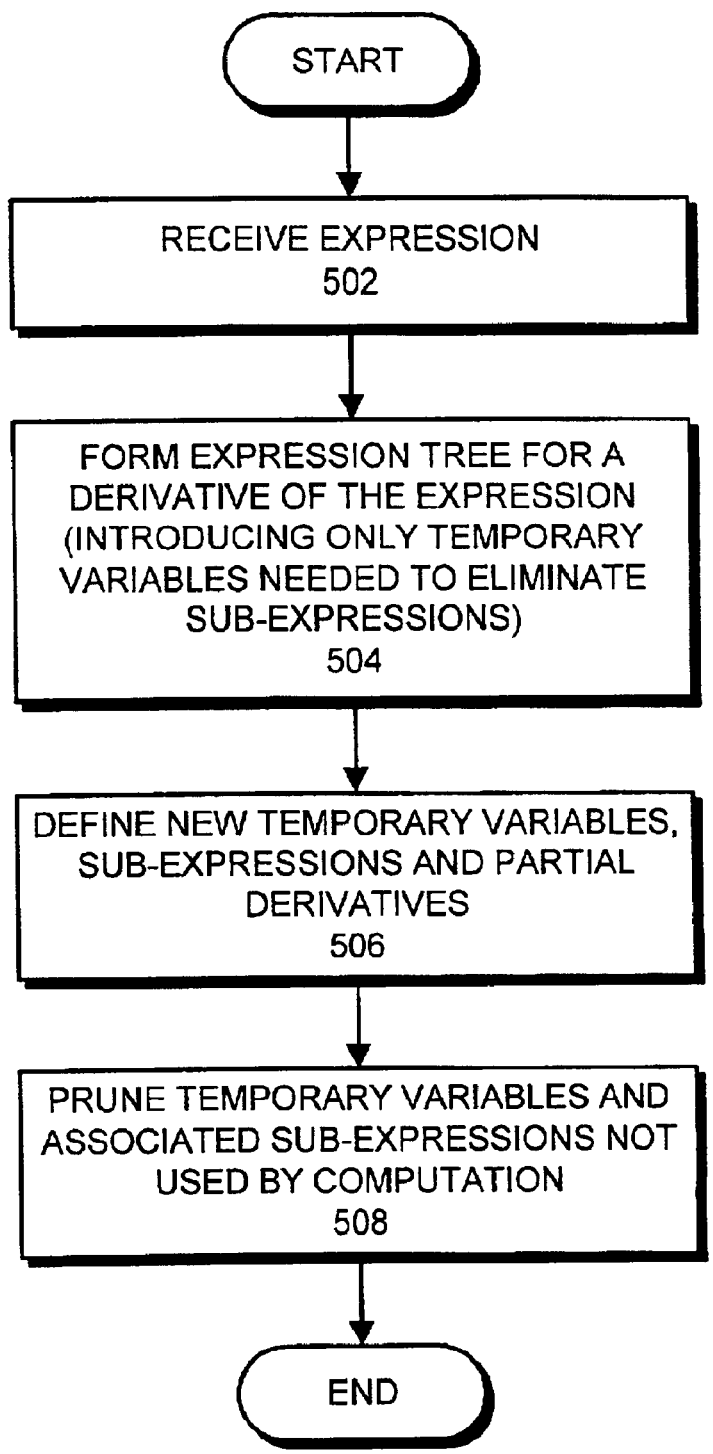
FIG. 5 is a flow chart illustrating the process of generating code for a derivative of an expression in accordance with an embodiment of the present invention.

FIG. 5 is a flow chart illustrating the process of generating code for a derivative of an expression in accordance with an embodiment of the present invention. The system starts by receiving an expression, such as (x+1)/sin(x+1) (step 502). In one embodiment of the present invention, this expression is in the form of a source code list for a pre-compiler as is illustrated in FIG. 3. In another embodiment, the code generation for the derivative takes place within compiler 400, and the expression is in an intermediate form 406 (see FIG. 4).

Next, the system forms an expression tree for a derivative of the expression (step 504). During this process, the system creates only temporary variables that are necessary to eliminate repeated sub-expressions. In doing so, the system can generate temporary variables for large multinomial sub-expressions, instead of binary operations. This increases the "molecular level" at which the symbolic differentiation takes place, and at which temporary variables are created. Note that by using multinomial expressions, the present invention is unlike existing automatic differentiation techniques that only associate temporary variables with simple binary expressions. Recall that multinomial expressions are typically expressed in a sum of products form. Division operations typically result in separate multinomial expressions for the numerator and denominator.

In symbolically computing the derivative of an expression, the system can apply the chain rule for differentiation. Recall that under the chain rule, if $$f(x) = a(x) * b(x), \frac{df(x)}{dx} = \frac{da(x)}{dx} b(x) + a(x) \frac{db(x)}{dx}$$

Similarly, if $$f(x) = \frac{a(x)}{b(x)}, \frac{df(x)}{dx} = \frac{b(x)\frac{da(x)}{dx} - a(x)\frac{db(x)}{dx}}{b(x)^2}$$

Next, in computing the derivatives, the system may define new temporary variables and new sub-expressions as well as corresponding partial derivatives of the new temporary variables (step 506). In one embodiment of the present invention, the system derives partial derivatives for every new temporary variable that is defined.

Finally, the system can prune away temporary variables and associated sub-expressions that are not used by the computation (step 508). This can be accomplished by traversing the expression tree starting from the root, and marking all temporary variables and partial derivatives that are used during the computation, and then pruning away all unmarked temporary variables and partial derivatives. This pruning process eliminates unused code.

Note that in order to perform a global optimization, all first order partial derivatives are computed with respect to all the independent variables in the computation. Furthermore, all second order partial derivatives are also computed. However, in other applications, such as Taylor approximations, higher order derivatives are required. The process of computing derivatives is completely general in this respect.

EXAMPLE

Referring back to the above-described example, we start with, $$f(x) = \frac{x+1}{\sin(x+1)}$$

The naïve automatic differentiation code list along with partial derivatives appear in Table 2. By eliminating common sub-expressions and pruning, the code list and partial derivatives that appear in Table 2 are reduced to the code list and partial derivatives that appear in Table 3.

TABLE 3

| | |
|---|---|
| T1 = X + 1 | D1 = 1 |
| T2 = SIN(T1) | D2 = COS(T1) |
| T3 = COS(T1) | D3 = -SIN(T1) |
| T4 = T2 - T1*T3 | D4 = D2 - (T1*D3 + T3) |
| T5 = T2**2 | D6 = 2T2*D2 |
| F = T4/T5 | DF = (T5*D4 - T4*D5)/T5**2 |

Note that temporary variable T4 is expressed as a multinomial, not a simple binary operation. Furthermore, note that a given multinomial can be much larger than the simple multinomial for T4.

Also note that since derivative D1 has the value "1", the term D1 can be eliminated in subsequent multiplication operations. For example, D2=COS(T1)D1 is simplified to D2=COS(T1). It also follows that derivatives with zero values can be eliminated in subsequent addition operations.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically generating code to compute a derivative of a numerical expression within a digital computer system, comprising:

receiving a representation of the numerical expression within the digital computer system, wherein the numerical expression includes one or more independent variables;

storing the representation in a computer memory;

forming an expression tree for the derivative of the numerical expression with respect to an independent variable, wherein the expression tree makes use of temporary variables to form results of sub-expressions for computing the derivative of the numerical expression; and wherein forming the expression tree involves seeking to introduce only temporary variables and associated sub-expressions as necessary to eliminate repeated common sub-expressions, thereby substantially minimizing the number of temporary variables; and using the expression tree to generate code to compute the derivative of the numerical expression during a computation.

2. The method of claim 1, wherein for each temporary variable in the expression tree, the method forms an expression for a partial derivative of the temporary variable with respect to each independent variable.

3. The method of claim 2, wherein forming the expression for a given partial derivative involves defining new temporary variables and corresponding sub-expressions and new partial derivatives.

4. The method of claim 1, wherein a given sub-expression can include a multinomial that contains more than one binary operation.

5. The method of claim 1, further comprising pruning sub-expressions and associated temporary variables that are not used by the computation.

6. The method of claim 5, wherein pruning sub-expressions involves:

marking all temporary variables used in evaluating the expression tree; and deleting unmarked temporary variables and associated sub-expressions.

7. The method of claim 1, wherein the method is performed within a compiler; and wherein the representation of the numerical expression is in the form of an Abstract Syntax Tree (AST).

8. The method of claim 1, wherein the method is performed within a pre-compiler;

wherein the expression tree is in the form of a source code list; and wherein each temporary variable and associated sub-expression in the expression tree is represented by computer code that sets the temporary variable equal to the associated sub-expression.

9. The method of claim 1, wherein the method is performed by code within a code library.

10. The method of claim 1, wherein the computation involves interval arithmetic; and wherein the one or more independent variables are interval variables.

11. A computer-readable storage medium storing instructions that when executed by a computer cause the computer to perform a method for automatically generating code to compute a derivative of a numerical expression within a digital computer system, the method comprising:

receiving a representation of the numerical expression within the digital computer system, wherein the numerical expression includes one or more independent variables;

storing the representation in a computer memory;

forming an expression tree for the derivative of the numerical expression with respect to an independent variable, wherein the expression tree makes use of temporary variables to form results of sub-expressions for computing the derivative of the numerical expression; and wherein forming the expression tree involves seeking to introduce only temporary variables and associated sub-expressions as necessary to eliminate repeated common sub-expressions, thereby substantially minimizing the number of temporary variables; and using the expression tree to generate code to compute the derivative of the numerical expression during a computation.

12. The computer-readable storage medium of claim 11, wherein for each temporary variable in the expression tree, the method forms an expression for a partial derivative of the temporary variable with respect to each independent variable.

13. The computer-readable storage medium of claim 12, wherein forming the expression for a given partial derivative involves defining new temporary variables and corresponding sub-expressions and new partial derivatives.

14. The computer-readable storage medium of claim 11, wherein a given sub-expression can include a multinomial that contains more than one binary operation.

15. The computer-readable storage medium of claim 11, wherein the method further comprises pruning sub-expressions and associated temporary variables that are not used by the computation.

16. The computer-readable storage medium of claim 15, wherein pruning sub-expressions involves:

marking all temporary variables used in evaluating the expression tree; and deleting unmarked temporary variables and associated sub-expressions.

17. The computer-readable storage medium of claim 11, wherein the method is performed within a compiler; and wherein the representation of the numerical expression is in the form of an Abstract Syntax Tree (AST).

18. The computer-readable storage medium of claim 11, wherein the method is performed within a pre-compiler;

wherein the expression tree is in the form of a source code list; and wherein each temporary variable and associated sub-expression in the expression tree is represented by computer code that sets the temporary variable equal to the associated sub-expression.

19. The computer-readable storage medium of claim 11, wherein the method is performed by code within a code library.

20. The computer-readable storage medium of claim 11, wherein the computation involves interval arithmetic; and wherein the one or more independent variables are interval variables.

21. An apparatus for automatically generating code to compute a derivative of a numerical expression within a digital computer system, comprising:

a receiving mechanism that is configured to receive a representation of the numerical expression within the digital computer system, wherein the numerical expression includes one or more independent variables;

a storing mechanism that is configured to store the representation in a computer memory;

an expression tree forming mechanism that is configured to form an expression tree for the derivative of the numerical expression with respect to an independent variable, wherein the expression tree makes use of temporary variables to form results of sub-expressions for computing the derivative of the numerical expression; and wherein the expression tree forming mechanism seeks to introduce only temporary variables and associated sub-expressions as necessary to eliminate repeated common sub-expressions, thereby substantially minimizing the number of temporary variables; and an execution mechanism that is configured to use the expression tree to generate code to compute the derivative of the numerical expression during a computation.

22. The apparatus of claim 21, wherein for each temporary variable in the expression tree, the expression tree forming mechanism is configured to form an expression for a partial derivative of the temporary variable with respect to each independent variable.

23. The apparatus of claim 22, wherein in forming the expression for a given partial derivative, the expression tree forming mechanism is configured to define new temporary variables and corresponding sub-expressions and new partial derivatives.

24. The apparatus of claim 21, wherein a given sub-expression can include a multinomial that contains more than one binary operation.

25. The apparatus of claim 21, further comprising a pruning mechanism that is configured to prune sub-expressions and associated temporary variables that are not used by the computation.

26. The apparatus of claim 25, wherein the pruning mechanism is configured to:

mark all temporary variables used in evaluating the expression tree; and to delete unmarked temporary variables and associated sub-expressions.

27. The apparatus of claim 21, wherein the apparatus resides within a compiler; and wherein the representation of the numerical expression is in the form of an Abstract Syntax Tree (AST).

28. The apparatus of claim 21, wherein the apparatus resides within a pre-compiler;

wherein the expression tree is in the form of a source code list; and wherein each temporary variable and associated sub-expression in the expression tree is represented by computer code that sets the temporary variable equal to the associated sub-expression.

29. The apparatus of claim 21, wherein the apparatus includes code within a code library.

30. The apparatus of claim 21, wherein the computation involves interval arithmetic; and wherein the one or more independent variables are interval variables.

* * * * *